US008825841B2

(12) United States Patent
Seifert et al.

(10) Patent No.: US 8,825,841 B2
(45) Date of Patent: Sep. 2, 2014

(54) METHOD AND A SYSTEM FOR ANALYSING TRAFFIC ON A WEBSITE INCLUDING MULTIPLE VISITS BY THE VISITORS

(75) Inventors: Michael Seifert, Charlottenlund (DK); Ralph Ronald Person, Santa Rosa, CA (US)

(73) Assignee: Sitecore A/S, Københaven V (DK)

( * ) Notice: Subject to any disclaimer, the term of this patent is extended or adjusted under 35 U.S.C. 154(b) by 373 days.

(21) Appl. No.: 13/072,342

(22) Filed: Mar. 25, 2011

(65) Prior Publication Data

US 2012/0246296 A1    Sep. 27, 2012

(51) Int. Cl.
*G06F 15/16*   (2006.01)
*G06Q 30/02*   (2012.01)
*H04L 29/08*   (2006.01)
*G06F 17/30*   (2006.01)

(52) U.S. Cl.
CPC ........... *G06Q 30/0246* (2013.01); *G06Q 30/02* (2013.01); *H04L 67/02* (2013.01); *H04L 67/22* (2013.01); *G06F 17/30899* (2013.01); *H04L 67/306* (2013.01)
USPC ........ 709/224; 705/7.29; 705/26.1; 705/7.36; 705/7.38; 705/14.42; 715/736; 715/738; 707/778

(58) Field of Classification Search
None
See application file for complete search history.

(56) References Cited

U.S. PATENT DOCUMENTS

| 6,792,458 | B1 | 9/2004 | Muret et al. | |
| 7,584,118 | B1* | 9/2009 | Bellare et al. | 705/14.69 |
| 7,644,375 | B1* | 1/2010 | Anderson et al. | 715/853 |
| 7,660,815 | B1* | 2/2010 | Scofield et al. | 707/999.102 |
| 7,774,335 | B1* | 8/2010 | Scofield et al. | 707/709 |
| 7,904,439 | B2* | 3/2011 | Horvitz et al. | 707/706 |
| 7,917,382 | B2* | 3/2011 | Cereghini et al. | 705/7.31 |
| 8,145,526 | B2* | 3/2012 | Redlich | 705/14.46 |
| 2002/0042821 | A1 | 4/2002 | Muret et al. | |
| 2002/0062223 | A1 | 5/2002 | Waugh | |
| 2002/0070953 | A1* | 6/2002 | Barg et al. | 345/700 |
| 2006/0015504 | A1* | 1/2006 | Yu et al. | 707/10 |
| 2008/0183745 | A1* | 7/2008 | Cancel et al. | 707/102 |

(Continued)

FOREIGN PATENT DOCUMENTS

| WO | WO 00/45264 A1 | 8/2000 |
| WO | WO 2007/051051 A2 | 5/2007 |
| WO | WO 2010/104928 A1 | 9/2010 |

*Primary Examiner* — Greg C Bengzon
(74) *Attorney, Agent, or Firm* — Birch, Stewart, Kolasch & Birch, LLP

(57) ABSTRACT

A method and a system for analyzing traffic on a website are disclosed, the website being arranged on a server. The method comprises the steps of allowing a visitor to perform multiple visits on the website, and monitoring navigations and/or actions performed by the visitor during each visit while accumulating value points in accordance with content viewed by the visitor and actions performed by the visitor, and in accordance with predefined value point settings associated with content of the website, thereby obtaining a value point score for each visit. An origin of the first visit, leading the visitor to the website, is registered and categorized according to type of origin in accordance with two or more predefined categories of origin. An accumulated value point score for the visitor is obtained by adding the obtained value point scores of the first visit and each of the subsequent visit(s). Thereby the website owner obtains information regarding total value generated by the visitor during all visits and regarding what initially lead the visitor to the website. This allows the website owner to evaluate marketing campaigns and to focus and/or improve marketing efforts.

31 Claims, 7 Drawing Sheets

(56) References Cited

U.S. PATENT DOCUMENTS

2008/0306830 A1 12/2008 Lasa et al.
2009/0327050 A1* 12/2009 Fishteyn et al. ................ 705/10
2010/0161540 A1 6/2010 Anisimov et al.
2010/0251128 A1* 9/2010 Cordasco ..................... 715/736
2011/0055021 A1* 3/2011 Haag .......................... 705/14.69
2011/0307515 A1* 12/2011 Chen et al. ................... 707/770

* cited by examiner

METHOD AND A SYSTEM FOR ANALYSING TRAFFIC ON A WEBSITE INCLUDING MULTIPLE VISITS BY THE VISITORS

FIELD OF THE INVENTION

The present invention relates to a method and a system for analysing traffic on a website, wherein at least some of the visitors perform two or more visits on the website, and wherein the visitors are categorised according to origin of the first visit on the website, and information regarding origin of the first visits is stored along with value point scores accumulated during the visits of each visitor.

BACKGROUND OF THE INVENTION

For website owners it is often desirable to be able to analyse the traffic on a website, e.g. in order to determine where the traffic originates from, which advertising campaigns were successful in guiding visitors to the website, etc. It may also be desirable for website owners to investigate whether or not certain goals of the website are obtained by the traffic on the website. Such goals may, e.g., include visitors purchasing or ordering products or services, filling in a contact form, requesting a web based demo, ordering a catalogue, staying at the website for a specific time period, etc. Furthermore, it may be desirable for website owners to investigate whether or not visitors return to the website.

Various analytic tools exist which provide the website owner with information regarding the amount of traffic on the website, including the origin of the traffic. Google® Analytics is one example of such a tool. However, these tools provide no, or only little, information regarding the quality of the traffic, i.e. it is not possible to derive which part of the traffic was successful with respect to achieving the goals of the website owner. Furthermore, these tools provide no, or only little, information regarding whether or not visitors return to the website, or why visitors choose to return, or not to return, to the website.

US 2008/0306830 A1 discloses a system for determine session, visitor, advertiser and/or website click quality scores. The system uses a script included in each page of each website monitored by the system to capture data. A method for determining whether a goal is achieved may include assigning a website goal associated with access to a category of a page and recording the achievement of the goal or goals, when a visitor in session accesses a page or pages of the specified category. A subsystem may assist in analysing the quality of visitors, the quality of visitors referred by a particular source, and the quality of a website, including any effects of changes made to the website or in comparison to other websites monitored by the system.

U.S. Pat. No. 6,792,458 B1 discloses a system and method for monitoring and analysing Internet traffic. In one embodiment the system and method include e-commerce analysis and reporting functionality, in which data from standard traffic logs is received and merged with data from e-commerce systems. The system and method can produce reports showing detailed "return on investment" information, including identifying which banner ads, referrals, domains, etc. are producing specific dollars.

None of the prior art documents cited above describe systems or methods providing information to website owners about correlation between value generated during a sequence of visits by a visitor on a website and the origin of the first visit of the sequence of visits.

DESCRIPTION OF THE INVENTION

It is an object of embodiments of the invention to provide a method for analysing traffic on a website, which allows a website owner or manager to obtain detailed information regarding origin of generated value at the website.

It is a further object of embodiments of the invention to provide a method for analysing traffic on a website, which enables a website owner or manager to target his or her marketing effort in a manner which is likely to create value for the website owner.

It is an even further object of embodiments of the invention to provide a method for analysing traffic on a website, which allows a website owner or manager to obtain information regarding value generated during a sequence of visits by a visitor on the website.

It is an even further object of embodiments of the invention to provide a system for analysing traffic on a website, which allows a website owner or manager to obtain detailed information regarding origin of generated value at the website.

It is an even further object of embodiments of the invention to provide a system for analysing traffic on a website, which enables a website owner or manager to target his or her marketing effort in a manner which is likely to create value for the website owner.

It is an even further object of embodiments of the invention to provide a system for analysing traffic on a website, which allows a website owner or manager to obtain information regarding value generated during a sequence of visits by a visitor on the website.

According to a first aspect the invention provides a method for analysing traffic on a website, the website being arranged on a server, the method comprising the steps of:

allowing a visitor to perform a first visit on the website, monitoring navigations and/or actions performed by the visitor during the first visit while accumulating value points in accordance with content viewed by the visitor and actions performed by the visitor, and in accordance with predefined value point settings associated with content of the website, thereby obtaining a value point score for the first visit, registering an origin of the first visit, leading the visitor to the website, storing the value point score for the first visit along with the registered origin of the first visit in a storage device, categorising the stored value point score for the first visit and the origin of the first visit according to type of origin in accordance with two or more predefined categories of origin, allowing the visitor to perform one or more subsequent visit(s) on the website, for each subsequent visit, monitoring navigations and/or actions performed by the visitor during the visit while accumulating value points in accordance with content viewed by the visitor and actions performed by the visitor, and in accordance with predefined value point settings associated with content of the website, thereby obtaining a value point score for each subsequent visit, and obtaining an accumulated value point score for the visitor by adding the obtained value point scores of the first visit and each of the subsequent visit(s).

In the present context the term 'website' should be interpreted to mean a collection of related web pages, images, videos or other digital assets being addressed relative to a common Uniform Resource Locator (URL). The web pages of the website may advantageously be designed, presented and linked together to form a logical information resource and/or transaction initiation function. According to the first aspect of the invention, the website being managed is arranged on, or hosted on, a server. The server, and thereby the website, is typically accessible via a data network, such as the Internet or a Local Area Network (LAN).

It should be noted that, in the present context, the term 'server' should be interpreted to cover a single device as well as two or more individual devices being interlinked in such a manner that they, to a visitor of the website, seem to act as a single device.

In the present context the term 'traffic on a website' should be interpreted to mean visitors visiting the website, navigating within the website and performing actions within the website.

According to the first aspect of the invention, a visitor is initially allowed to perform a first visit on the website. During the first visit, the navigations and/or actions performed by the visitor are monitored, while accumulating value points. Value point settings have previously been associated with content of the website, and the value points of the first visit are accumulated in accordance with these settings, and in accordance with the navigations and/or actions performed by the visitor. Thus, when a visitor encounters a specific piece of content during the first visit, the value points are adjusted with an amount corresponding to the value point setting associated with that piece of content.

In the present context the term 'content' should be interpreted to include anything which a visitor may experience during a visit to the website, including content presented to the visitor, such as web pages, images, video sequences, audible sequences, etc., actions performed by the visitor, including forms being filled in, searches performed within the website, tests, polls, etc., or any other kind of content which the visitor may experience or encounter during a visit to the website.

The predefined value point settings may reflect value obtained by the owner of the website due to navigations and/or actions performed by the visitor during the visit. In this case, the website owner or manager defines the value point setting in such a manner that navigations and/or actions which the website owner wants the visitor to perform and/or which generate value for the owner of the website, generate a high value point score. Accordingly, a high value point score for a visit indicates that the website owner gained a lot of value from the visit. Examples of high value behaviour may include, but are not limited to, purchasing a product via the website, requesting a web based demo, ordering a catalogue, requesting a personal contact, visiting at least a predefined number of web pages of the website, etc. Alternatively or additionally, the value point settings may reflect the commitment of the visitor, in which case a high value point setting reflects a high commitment by the visitor to the website. A high commitment could, e.g., be a visitor requesting an instant demo, thereby allowing the website owner to perform two-way communication with the visitor.

Accordingly, at the end of the first visit, a value point score for the first visit has been obtained, which reflects the value points 'collected' by the visitor during the first visit. If the value point settings are selected and assigned in an appropriate manner, the value point score may reflect the value which the first visit generated to the website owner, i.e. it is a measure for how valuable the first visit was.

In the present context the term 'first visit' could be interpreted to mean the first visit ever by the visitor on the website. Alternatively, it could be interpreted to mean the first visit by the visitor on the website within a specific time interval or the first visit by the visitor on the website following a predefined event, such as introduction of a marketing campaign, significant changes on the website, etc. As another alternative, the first visit could be defined in any other suitable manner which allows the website owner to obtain knowledge regarding the behaviour of visitors in response to specific marketing events.

Next, an origin of the first visit, leading the visitor to the website, is registered. The origin of the first visit provides information regarding where the traffic came from, i.e. what gave rise to the first visit by the visitor on the website. It may, e.g., be a specific search engine, a direct entry via the browser, following a link in a web advertisement, following a link in an e-mail campaign, following a link from a blog, etc.

The value point score for the first visit is then stored in a storage device, along with the registered origin of the first visit. Thus, correlated information of value of the first visit and origin of the first visit is stored. The storage device may form part of the server having the website arranged thereon. As an alternative, it may be arranged on another server arranged to communicate with the server having the website arranged thereon.

The stored value point score for the first visit and the origin of the first visit are then categorised according to type of origin in accordance with two or more predefined categories of origin.

The categories of origin may, e.g., include various kinds of referral sites, such as search engines (e.g. Google or Bing), blogs (e.g. Blogspace or Blogger), news sites (e.g. MSNBC or CNN), chat sources (e.g. Twitter or Buzz), community sites (e.g. LinkedIn or Facebook), Wiki sites (e.g. Wikipedia or Wikihow), analyst sites (e.g. Gartner or Forrester), e-mail traffic, RSS traffic, paid traffic (e.g. web based advertisements), etc. Alternatively or additionally, the categories of origin may include direct access to the website by typing the address of the website directly in the browser.

Next, the visitor is allowed to perform one or more subsequent visit(s) on the website. Thereby a sequence of visits is performed, the first visit described above being the first of the visits of the sequence, and the subsequent visit(s) following the first visit, one by one.

For each of the subsequent visits, the navigations and/or actions performed by the visitor are monitored, while accumulating value points, as described above with reference to the first visit. Accordingly, at the end of each subsequent visit, a value point score for that visit has been obtained, which reflects the value points 'collected' by the visitor during that visit, as described above with reference to the first visit.

Finally, an accumulated value point score for the visitor is obtained by adding the obtained value point scores of the first visit and each of the subsequent visit(s). Thus, the accumulated value point score reflects the total value points 'collected' by the visitor during all of the visits, i.e. the during the first visit as well as during each of the subsequent visit(s). Combining this information with the stored information regarding the category of the origin of the first visit, the website owner or manager obtains information, not only of the total value generated by the visitor, but also of where the value initially came from, i.e. the origin of the first visit, and which type of origin the value came from, i.e. the category of the origin of the first visit. This allows the website owner or manager to perform intelligent data mining or statistical analysis of the information. Thereby it is possible for the website owner to identify which types of origin result in value for the website owner, and which types of origin do not, in a long perspective. Furthermore, it is possible to perform similar analysis within each category of origin. Finally, it is possible to investigate whether or not a visitor returns to the website, and whether or not such subsequent visits result in value being generated for the website owner.

The method may further comprise the step of storing the accumulated value point score in the storage device along with the registered and categorised origin of the first visit. This may, e.g., be done by adding the value point score of a given visit to the stored value point score when the given visit has been completed. As an alternative, the value point scores of each visit may be stored individually, and the accumulated value point score may be obtained when it is desired to perform analysis on the obtained information. As another alternative, the accumulated value point score as well as the value point scores of each visit may be stored.

The method may further comprise the steps of, for each subsequent visit:
registering an origin of the visit, leading the visitor to the website, and
storing the value point score of the visit along with the registered origin of the visit in the storage device.

According to this embodiment, information regarding the origin of each of the subsequent visit(s) is registered and stored, in addition to the information regarding the origin of the first visit. Thereby it is possible for the website owner or manager to investigate how, and possibly why, the visitor returns to the website after the first visit. For instance, the first visit could originate from a search performed by means of a search engine, indicating that the visitor was initially not aware of the existence of the website, while one or more subsequent visits may originate from the visitor typing the address of the website directly into a browser, or typing the company name of the website owner directly into a search engine, indicating that the visitor is aware of the existence of the website and is actively searching for the website.

The method may further comprise the step of categorising the origin of each subsequent visit according to type of origin in accordance with two or more predefined categories of origin. The category of the origin of each subsequent visit may be stored along with the value point score for the visit. According to this embodiment, it is possible for the website owner or manager to select a given visit by the visitor on the website as the first visit, and to perform analysis on the available data originating from the selected visit and any visit(s) following the selected visit, regardless of whether or not the visitor has visited the website prior to the selected visit.

The method may further comprise the steps of:
analysing accumulated value point scores and categorised origins of the first visits originating from a plurality of visitors on the website, and
generating a report providing information regarding accumulated value point scores originating from predefined categories of origin.

According to this embodiment, a report is generated on the basis of information originating from sequences of visits by a plurality of visitors. The report reveals how the accumulated value point scores for the visitors relate to the predefined categories of origin. Thereby the report allows the website owner or manager to determine which categories of origin give rise to high accumulated value point scores, and which categories of origin give rise to low accumulated value point scores. Once this has been determined, the website owner or manager may investigate why some of the categories are more successful in providing visitors generating high value point scores than other. The website owner or manager may then decide to focus marketing efforts on the more successful categories of origin and/or he or she may attempt to amend the website to become more appealing to the visitors originating from origins belonging to the less successful categories of origin, e.g. in order to tempt these visitors to return to the website, thereby increasing the accumulated value point scores for these visitors. In some cases the categories of origin may correspond to marketing efforts by specific marketing departments or hired agencies. In this case the obtained information may be used for understanding which departments or consultants need to either improve or scale down such that marketing funds can be used more efficiently in other categories. The generated report reflects what initially triggered the visitors to visit the website, and combines this information with information regarding the total value generated by visitors during the first visit, as well as during any subsequent visit following the first visit.

The method may further comprise the step of generating at least one sub-report providing information regarding accumulated value point scores originating from various origins of first visits within a predefined category of origin. According to this embodiment, the available data is further 'drilled down' in order to provide more detailed information to the website owner or manager. Thus, it is not only possible for the website owner or manager to investigate which categories of origin are successful or unsuccessful, it is also possible to investigate whether or not some origins within a given category of origin are significantly more or less successful than the other origins within that category of origin. The website owner or manager may then investigate why the successful origins are successful and why the unsuccessful origins are unsuccessful. Once this has been determined, the website owner or manager may determine to focus marketing effort on the successful origins and/or to attempt to amend the website to become more appealing or easier to use for visitors from the less successful origins.

The step of generating a report may comprise generating and displaying a visual representation of the accumulated value point scores and the predefined categories of origin. The visual representation may, e.g., include a bar chart, a pie chart, a graph, and/or any other suitable kind of visual representation which provides a clear overview of the information to the website owner or manager.

The method may further comprise the step of registering time elapsed between visits of the visitor on the website, and the generated report may further provide information regarding time elapsed between visits of the visitor. According to this embodiment, the report reflects how often the visitors visit the website, and combines this information with information regarding the origin of the first visit and information regarding the accumulated value point score. Such information may, e.g., be used by the website owner or manager to improve the website in such a manner that the number of visits and/or the frequency of visits by some visitors is/are increased.

The method may further comprise the step of registering time duration of each visit performed by the visitor on the website, and the generated report may further provide information regarding time duration of the visits of the visitor. According to this embodiment, the report reflects how much time the visitor spends on the website during the visits, and combines this information with information regarding the origin of the first visit and information regarding the accumulated value point score. Such information may, e.g., be used by the website owner or manager to improve the website in such a manner that the time spent during the visits by some visitors is increased and/or in such a manner that the value generated during the time spent by the visitor on the website is increased.

The step of obtaining an accumulated value point score may be performed immediately prior to or as a part of the step of analysing. According to this embodiment, the value point score of each visit is stored individually in the storage device, and the accumulated value point score is not obtained until it is desired to perform analysis on the obtained data. According to this embodiment, it is not required to store the accumulated value point score, though this is not ruled out. Storing the individual value point scores for the visits allows the website owner or manager to base the analysis on a selected sequence of visits, defining the first visit as the visit of the sequence which occurs first. The sequence may, e.g., be selected as visits occurring within a predefined time interval or visits occurring after a specific event, etc. As described above, an accumulated value point score may, alternatively, be obtained and stored each time a visit is completed.

The method may further comprise the steps of:
defining a set of visitors having been exposed to a predefined campaign, and
for each visitor of the set of visitors, defining a visit originating from the predefined campaign as the first visit on the website by the visitor.

The campaign may, e.g., be a nurture campaign, e.g. distributed via e-mail, a marketing campaign, e.g. in the form of TV spots, banner ads, etc., an e-mail campaign directed towards possible new visitors based on lists of e-mail addresses obtained from an external supplier, such as American Marketing Association or a similar supplier, or any other suitable kind of campaign.

According to this embodiment, a campaign is launched by the website owner or manager, and a group of visitors, which have been exposed to the campaign, is identified and defined as a set of visitors which it is desired to investigate further. For each of the visitors of the defined set of visitors, a visit which originates from the campaign is identified. The identified visit is then defined as the first visit by the visitor on the website. Accordingly, the stored data for each visitor of the set of visitors provides information relating to the origin of the first visit identified in this manner, i.e. the campaign, and accumulated value point score obtained for this visit and any visit taking place after the visit originating from the campaign. Thus, the stored data only relates to the behaviour of the visitors after the campaign took place, and it is thereby possible for the website owner or manager to investigate how the campaign affects the generated value, and thereby whether or not it is worth using company resources on a similar campaign at a later point in time, or the resources could be spent in a more efficient and/or value generating manner. Accordingly, the website owner or manager is provided with a valuable tool for ensuring that marketing efforts are focused on value generating measures.

The method may further comprise the steps of:
allowing a plurality of visitors to perform one or more visits on the website,
for each visitor, registering a sequence of visits on the website, registering and categorising origin of each visit, obtaining value point score of each visit, and obtaining an accumulated value point score for the visitor,
defining a set of visitors from the plurality of visitors, and
building visit patterns based on the categorized origins of each visit by the visitors of the set of visitors, where the registered sequences of visits form the visit patterns, the visit patterns including one or more full visit patterns, each full visit pattern corresponding to a complete registered sequence of visits of at least one visitor.

According to this embodiment, a plurality of visitors is allowed to perform one or more visits on the website, in the manner described above. For each visitor, a sequence of visits on the website is registered, the origin of each visit is registered and categorised, value point scores for each visit are obtained, and an accumulated value point score for the visitor is obtained, in the manner described above. Thus, for each visitor, information regarding value generated during all of the visits of the sequence of visits as well as regarding the origins of the visits is obtained.

Next, a set of visitors from the plurality of visitors is defined. The set of visits may include all of the plurality of visitors, or it may form a subset of the plurality of visitors. In the case that the set of visitors forms a subset of the plurality of visitors, the set of visitors may be selected on the basis of various criteria, such as visitors referred to the website from a specific referral or a specific type of referral, visitors visiting the website during a specific time period, visitors from a specific geographical region, etc.

Next, visit patterns are built based on the categorised origins of each visit by the visitors of the set of visitors. The registered sequences of visits form the visit patterns. Thus, the visit patterns illustrate the sequences of visits and the categorised origins of the visits performed by the visitors on the website. The visit patterns include one or more full visit patterns, each full visit pattern corresponding to a complete registered sequence of visits of at least one visitor.

The method may further comprise the step of:
for each full visit pattern, calculating a total visit value being the sum of accumulated value point scores for all visitors with registered sequences forming said full visit pattern.

According to this embodiment, the total visit value of a given full visit value reflects the value generated for the website owner by the visitors having sequences of visits forming the full visit pattern.

Accordingly, the visit patterns along with the calculated total visit values provides information to the website owner or manager regarding which sequences of visits and categorised origins of visits generate value for the website owner and which do not. This information can be used as a basis for investigating why certain sequences of visits and categorised origins of visits result in value being generated for the website owner, while others do not. This may, e.g., reveal inefficient marketing efforts and allow the website owner or manager to focus the marketing efforts towards origins of visits which generate value for the website owner, not only during the initial visit, but also during subsequent visits by the visitor on the website.

The method may further comprise the step of identifying a most efficient full visit pattern being the full visit pattern with the highest total visit value per visitor in the full visit pattern. Thus, the most efficient full visit pattern is the full visit pattern which generates the highest value per visitor. However, it might not be the full visitor pattern which generates the highest total value, because a less efficient visit pattern may have more visitors, thereby generating a higher total value.

The visit patterns may further include at least one partial visit pattern, each partial visit pattern corresponding to a part of registered sequence of at least one visitor. According to this embodiment, the visit patterns include full visit patterns as well as partial visit patterns. It should be noted that a visit pattern which constitutes a partial visit pattern with respect to one visitor may constitute a full visit pattern with respect to another visitor. According to this embodiment, the visit patterns provide a complete overview of the sequences of visits of the visitors of the set of visitors.

The method may further comprise the steps of:
analysing each partial visit pattern, and
for each partial visit pattern, identifying a value point loss for said partial visit pattern, based on the analysis step.

According to this embodiment, the website owner or manager obtains information regarding which visit, and origins of visits, result in loss of value points, i.e. which origins of visits leads to visitor behaviour which is undesirable with respect to obtaining desired goals for the website owner.

The visit patterns may form an ordered tree data structure, where the categories of the origins of the visits form nodes of the ordered tree data structure. The ordered tree data structure may, e.g., be in the form of a TRIE.

The method may further comprise the steps of:
for each visitor, assigning a node value to each node corresponding to a visit of the sequence of visits, the node value being the accumulated value point score for the visitor, and
for each node, calculating a total node value being the sum of all node values assigned to the node.

Thus, the total node value provides information regarding the total value generated by all visitors having a sequence of visits which includes a visit with a category of origin corresponding to the node.

The method may further comprise the step of assigning a node count to each node, the node count being the number of visitors having a sequence of visits including a visit corresponding to said node. Thus, the node count provides information regarding how many visitors have performed a visit on the website, where the visit had an origin within the category corresponding to the node.

The method may further comprise the step of, for each node, calculating a total node efficiency per visitor being the total node value divided by the node count. Whereas the total node value and the node count are quantitative measures, the total node efficiency per visitor is a qualitative measure in the sense that it provides information regarding how efficient each visitor is on average.

The total node value, the node count and the total node efficiency per visitor each provide useful information to the website owner or manager, in particular when evaluated in combination. For instance, a high total node value for a given node indicates that visitors having sequences of visits including visits with an origin corresponding to the node generate high value for the website owner. However, this may be primarily due to a high visitor count, while the total node efficiency per visitor may be relatively low. In this case an analysis will reveal to the website owner or manager that the value generated for the website owner can easily be increased by improving the total node efficiency per visitor. Similarly, a node with high total node efficiency per visitor may have a relatively low total node value, if the node count is low. In this case the value generated for the website owner can be increased by increasing the node count of the node. Once this has been realised, the website owner or manager may adjust the website in order to encourage behaviour of visitors which helps obtaining increased node value per visitor or increased node count. Furthermore, the website owner or manager obtains useful information regarding how marketing efforts can be focused and/or improved.

Alternatively or additionally, the website owner or manager can retrieve information regarding the potential of each of the nodes from the total node values, the node counts and/or the total node efficiencies per visitor. For instance, if one or more of these values for a specific node is/are significantly lower than the average value(s) of the nodes of the entire ordered tree data structure, this is an indication that there may be an unexploited potential for that node. Accordingly, it is probably possible to increase the total generated value for the website owner by improving the origins of visits corresponding to this node.

The method may further comprise the step of analysing the ordered tree data structure and the node values.

In this case the method may further comprise the step of identifying a most valuable full visit pattern of the ordered tree data structure, based on the analysis step. The most valuable full visit pattern may, e.g., be the full visit pattern having highest total node values.

Alternatively or additionally, the method may further comprise the step of identifying a most efficient full visit pattern of the ordered tree data structure, based on the analysis step. The most efficient full visit pattern may, e.g., be the full visit pattern having the highest total node efficiency per visitor.

Alternatively or additionally, the method may further comprise the step of identifying a most valuable node of the ordered tree data structure, based on the analysis step. The most valuable node may, e.g., be the node having the highest total node value.

Alternatively or additionally, the method may further comprise the step of identifying a most efficient node of the ordered tree data structure, based on the analysis step. The most efficient node may, e.g., be the node having the highest node efficiency per visitor.

The origin of the first visit may include a referral which referred the visitor to the website. The referral may be another website, e.g. a search engine, a web based advertisement, a blog, an e-mail campaign, etc. Alternatively or additionally, the origin of the visit may include directly typing the address of the website into the browser.

The method may further comprise the steps of:
registering one or more search keywords applied by the visitor, and
storing the registered search keyword(s) along with the value point score and the registered origin of the first visit.

In the case that the origin of the visit was a referral from a search engine, it may be desirable for the website owner or manager to know which search keywords the visitor applied, and which eventually led the visitor to the website via the search engine. This may also provide information to the website owner or manager regarding awareness of the company and/or company name.

The categories of origin may be extended with search engines where the search term contains the company brand (search engine branded searches) and search engines where the search term does not contain the company brand (search engine organic searches).

According to one embodiment, the presence or absence of specific search keywords can affect the category of origin.

According to a second aspect the invention provides a system for analysing traffic on a website arranged on a server, the system comprising:
a monitoring module adapted to monitor navigations and/or actions performed by a visitor during a sequence of visits on the website by said visitor, said monitoring module further being adapted to accumulate value points in accordance with content viewed by the visitor and actions performed by the visitor, and in accordance with predefined value point settings associated with the content of the website, thereby obtaining a value point score for each visit of the sequence of visits, said monitoring module further being adapted to register an origin of a first visit of said sequence of visits, leading the visitor to the website at said first visit, and said monitoring module further being adapted to add obtained value point scores of each of the visits of the sequence of visits, thereby obtaining an accumulated value point score for the visitor, a storage device for storing value point scores and/or accumulated value point scores along with registered origins of first visits, for each visitor visiting the website, and a categorising module adapted to categorise stored accumulated value point scores and origins of first visits according to type of origin in accordance with two or more predefined categories of origin.

It should be noted that a person skilled in the art would readily recognise that any feature described in combination with the first aspect of the invention could also be combined with the second aspect of the invention, and vice versa.

The system according to the second aspect of the invention may advantageously be used for performing the method according to the first aspect of the invention, and the remarks set forth above with reference to the first aspect of the invention are therefore equally applicable here.

The categorising module may form part of the monitoring module. According to this embodiment, the categorising is performed locally.

The system may further comprise an analysis module adapted to analyse stored and categorised accumulated value point scores and origins of first visits originating from a plurality of visitors. The analysis module may form part of the monitoring module. As an alternative, the analysis module may be a separate module.

The analysis module may be adapted to build visit patterns based on sequences of visits by visitors of a defined set of visitors, where the sequences of visits form the visit patterns.

The system may be residing on the server having the website arranged thereon.

BRIEF DESCRIPTION OF THE DRAWINGS

The invention will now be described in further detail with reference to the accompanying drawings, in which.

DETAILED DESCRIPTION OF THE DRAWINGS

Figure 1:
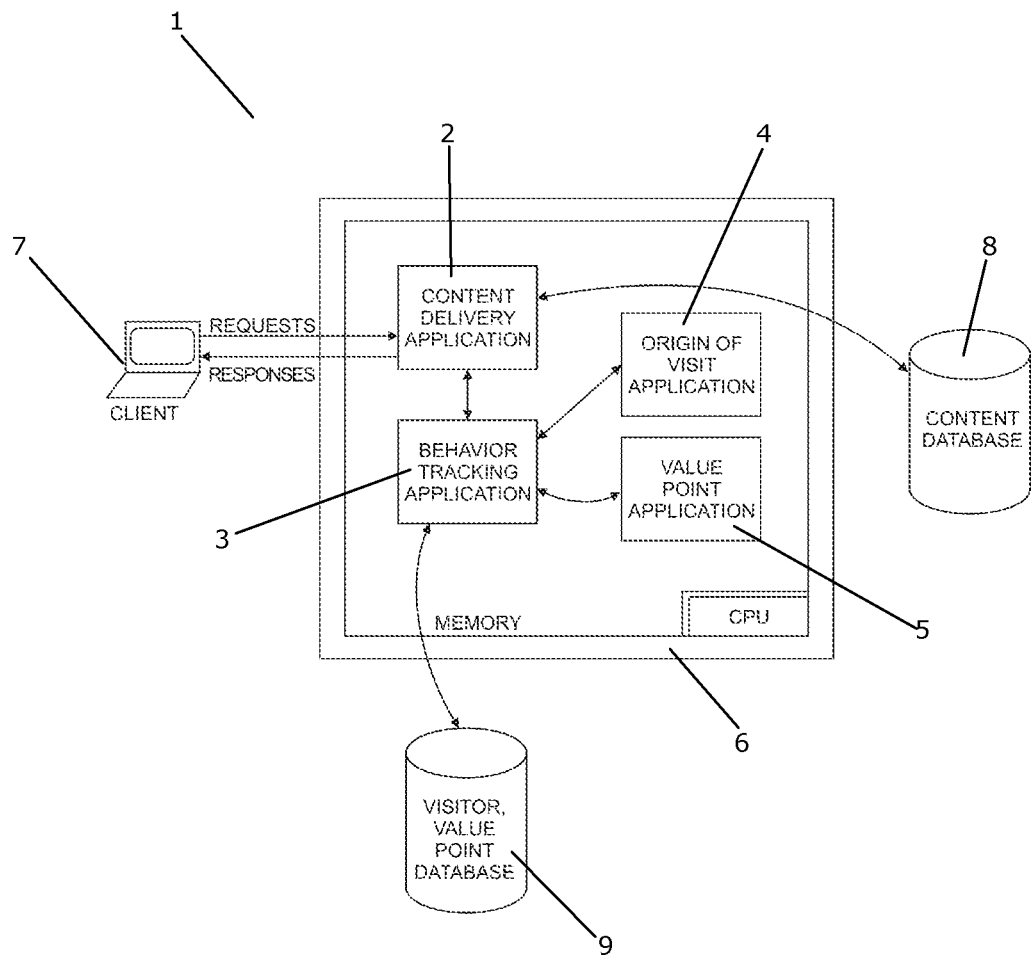
FIG. 1 is a diagrammatic view of a system according to a first embodiment of the invention.

FIG. 1 is a diagrammatic view of a system 1 according to a first embodiment of the invention. The system 1 is suited for being used for analysing traffic on a website. The system 1 comprises a content delivery application 2, a behaviour tracking application 3, an origin of visit application 4 and a value point application 5, all residing on a server 6.

A visitor accesses the content of the website from a client device 7, and the content delivery application 2 delivers content to the client device 7 upon request from the visitor, thereby allowing the visitor to view desired content and/or perform desired actions within the website. The content is supplied to the content delivery application 2 by a content database 8. In FIG. 1 the client device 7 is illustrated as a personal computer (PC), but it should be noted that the client device 7 could alternatively be a cell phone, a tablet, a TV, or any other suitable kind of client device allowing the visitor to access the website content.

While the visitor navigates the website, the behaviour tracking application 3 monitors the navigations and/or actions performed by the visitor. During this, the behaviour tracking application 3 and the value point application 5 in cooperation accumulate value points for the visit. The value points are accumulated in accordance with the content viewed by the visitor and/or actions performed by the visitor during the visit. Previously, the content of the website has been associated with value point settings reflecting the value generated for the website owner when a visitor encounters specific content of the website. Thus, when a visitor views a specific piece of content or performs a specific action, value points corresponding to the viewed content or performed action are added to the value point score for the visit. Accordingly, when the visit is completed, a value point score for the visit has been obtained, and the value point score represents the value generated for the website owner during the visit.

Simultaneously, the behaviour tracking application 3 and the origin of visit application 4 in cooperation register an origin of the visit. The origin of the visit provides information regarding where the traffic came from. It may, e.g., be a specific search engine, a direct entry via the browser, following a link in a web advertisement, following a link in an e-mail campaign, following a link from a blog, etc.

The value point score and the origin of the visit are stored together in a visitor, value point database 9. Accordingly, the stored visit data provides correlated information regarding accumulated value points and the origin of the visit, i.e. where the traffic came from. Thereby the stored data provides information regarding where the accumulated value came from, as well as which origins of visit generated no value or only very little value for the website owner.

In the visitor, value point database 9, the stored value point scores and origins of the visit are categorised in accordance with two or more predefined categories of origin. The categories of origin may, e.g., include various kinds of referral sites, such as search engines, blogs, web based advertisements, e-mail campaigns, etc. Alternatively or additionally, the categories of origin may include direct access to the website by typing the address of the website directly in the browser.

The visitor may perform one or more subsequent visits on the website, in the manner described above. When this occurs, the behaviour tracking application 3 inquires the visitor, value point database 9 in order to identify and locate the stored data originating from the previous visit(s) by the visitor on the website. Value point scores and origin of visit for the current visit are then stored in the visitor, value point database 9 together with the data originating from the previous visit(s). Furthermore, an accumulated value point score for the visitor may be calculated by adding value point scores obtained during all of the visits performed by the visitor on the website.

Thus, the stored data provides information to the website owner regarding total value generated by the visitor, and the type of origin of the first visit of the visitor on the website, i.e. where the visitor initially came from. This allows the website owner or manager to perform intelligent data mining or statistical analysis of the information. It is also possible for the website owner to identify which types of origin result in value for the website owner, and which types of origin do not, and thereby allows the website owner to focus and/or improve the marketing efforts.

Figure 2:
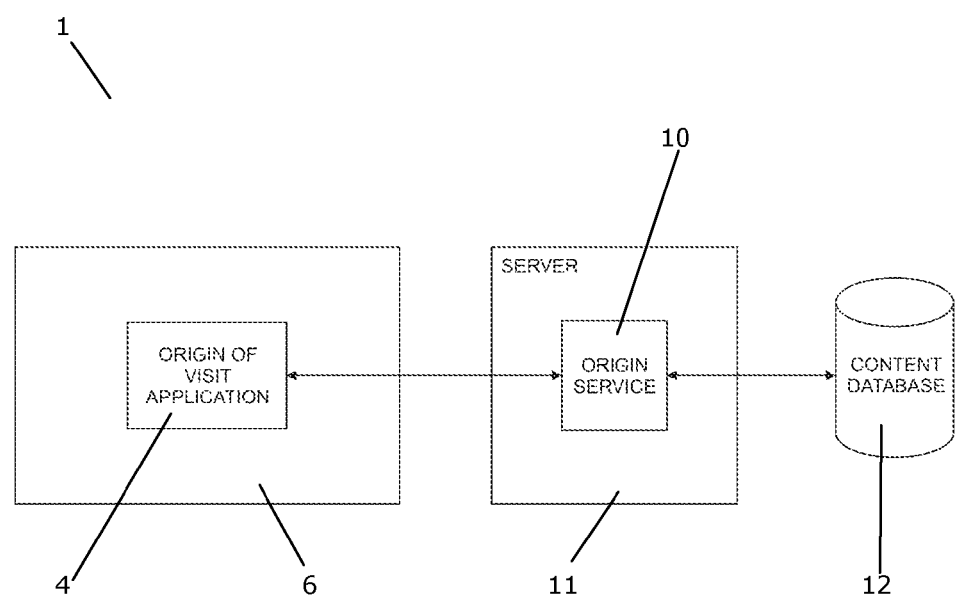
FIG. 2 is a diagrammatic view of a system according to a second embodiment of the invention.

FIG. 2 is a diagrammatic view of a system 1 according to a second embodiment of the invention. The system 1 of FIG. 2 could advantageously form part of or cooperate with the system 1 illustrated in FIG. 1.

An origin of visit application 4 is residing on a server 6, e.g. the server 6 illustrated in FIG. 1. As described above, the server 6 can be accessed by a visitor visiting the website. An origin service 10 resides on a remote server 11. The remote server 11 may, e.g., be located at an external supplier, such as a hosting facility, a website administrator or a service provider providing analysis services for several website owners.

When the origin of visit application 4 receives information regarding the origin of the visit, it forwards this information to the origin service 10. Based on previous experience and knowledge, e.g. stored in a content database 12, the origin service 10 determines which category the origin of the visit belongs to. This information is returned to the origin of visit application 4, and the origin of visit application 4 is thereby capable of categorising the origin of the visit.

The origin service 10 may be used for determining the category of the origin of each visit. As an alternative, the origin service 10 may be used only when the origin of visit application 4 is not capable of determining the category of the origin of the visit.

One advantage of the system 1 of FIG. 2 is that the origin service 10 will most likely categorise significantly more origins than corresponding to visits to a single website. Therefore the origin service 10 is more likely to be able to recognise a given origin and thereby be able to categorise the origin correctly.

In the case that the origin service 10 is in doubt with respect to the category of a given origin, a request may be referred back to the origin of visit application 4. The owner or manager of the website may then categorise the origin of the visit manually. This information may then be supplied to the origin service 10, and the origin service 10 will then be capable of categorising this origin the next time it occurs, possibly from a different website. Thereby fast and accurate categorisation can be obtained.

Figure 3:
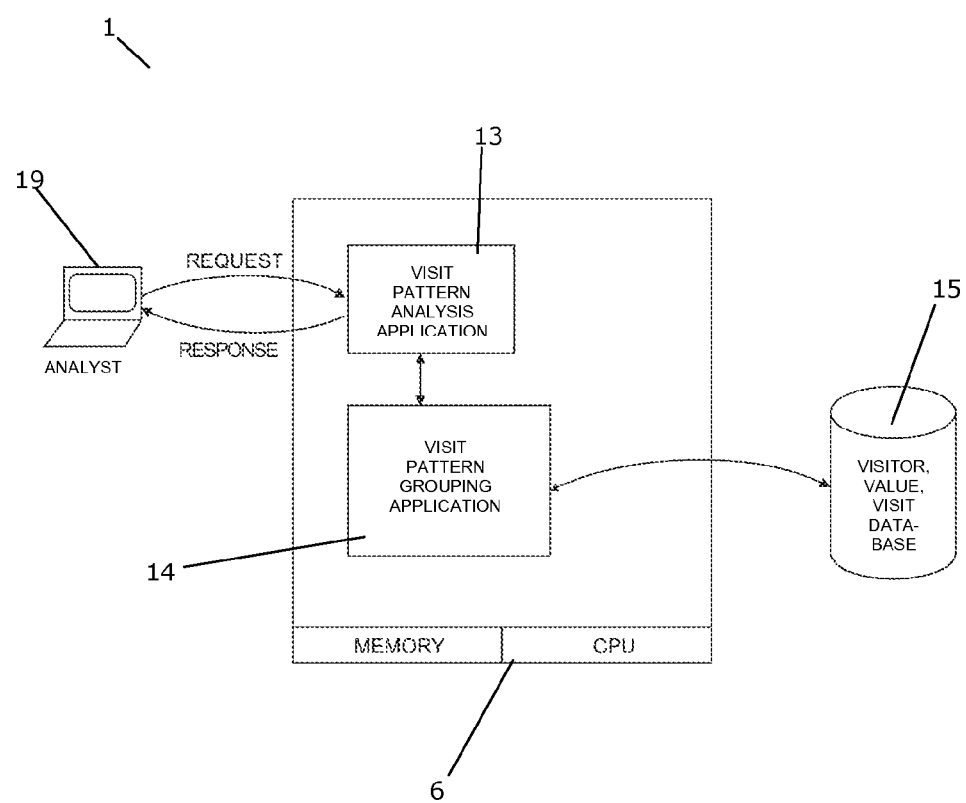
FIG. 3 is a diagrammatic view of a system according to a third embodiment of the invention.

FIG. 3 is a diagrammatic view of a system 1 according to a third embodiment of the invention. The system 1 is suited for being used for analysing traffic on a website. The system 1 comprises a visit pattern analysis application 13 and a visit pattern grouping application 14, both residing on a server 6.

A visitor, in the form of an analyst, accesses the visit pattern analysis application 13 from an analyst device 19. Upon request from the analyst, data is delivered to the analyst device 19 by the visit pattern analysis application 13, thereby allowing the analyst to request analysis on the data and gain access to the results of the performed analysis. In FIG. 3 the analyst device 19 is illustrated as a personal computer (PC), but it should be noted that the analyst device 19 could alternatively be a cell phone, a tablet, or any other suitable kind of device allowing the analyst to access the analysis application 13.

The data supplied to the analyst device 19 by the visit pattern analysis application 13 comprises visit patterns generated on the basis of sequences of visits on the website by a plurality of visitors. The data further comprises information regarding number of visits and visitors, value point scores for these visits, accumulated value point scores for each visitor and origin and category of origin of at least the first visit of the sequence of visits of each visitor. Finally, the data may comprise the result of analysis performed by the visit pattern analysis application 13 on visit patterns received from the visit pattern grouping application 14. This will be described in further detail below with reference to FIG. 4.

The visit pattern grouping application 14 assigns total value points to the visit patterns in accordance with the accumulated value point scores of the visitors. Furthermore, the visit pattern grouping application 14 analyses the visit patterns and assigned total value points in order to identify visit patterns which generate value for the website owner and visit patterns which do not. The result of the analysis is communicated to the visit pattern analysis application 13.

The visit pattern analysis application 13 communicates the visit patterns along with the total visit pattern values to the analyst device 19. This allows the analyst to evaluate the result of the performed analysis, and to adjust his or her behaviour accordingly. Furthermore, the analyst may request the visit pattern analysis application 13 to perform desired analysis on the available data, and/or to supply the analysis result in a desired format. Such desired analysis may, e.g., involve only a subset of the available data, and the visit pattern analysis application 13 may therefore have to request relevant patterns from the visit pattern grouping application 14. In turn, the visit pattern grouping application 14 may have to request a relevant subset of data from a visitor, value, visit database 15 in order to be able to supply the required visit patterns. Once the visit pattern analysis application 13 has performed the requested analysis, the analysis result is supplied to the analyst device 19 in the requested format or visual representation, thereby allowing the analyst to extract the desired information from the analysed data.

All of the visit patterns, along with the corresponding total visit pattern values, are stored in a visitor, value, visit database 15 which is capable of communicating with the visit pattern grouping application 14. Thus, the visit pattern grouping application 14 can communicate new visit patterns and total visit pattern values to be stored to the visitor, value, visit database 15, and the visitor, value, visit database 15 can communicate previously stored visit patterns and total visit pattern values to the visit pattern grouping application 14 for further analysis.

During the analysis performed by the visit pattern grouping application 14 and the visit pattern analysis application 13 complex visit patterns involving sequences of visits by several visitors are built. These complex visit patterns are stored in the visitor, value, visit database 15. The complex visit patterns provide information regarding value generated by visitors during various sequences of visits on the website. It further provides information regarding which origins of visits, in particular which origins or categories of origins of first visits, appear to generate high value, and which do not. The website owner or manager can use this information for adjusting the website in order to increase the total value generated for the website owner by the visitors, and/or for focusing and/or improving marketing efforts.

Figure 4:
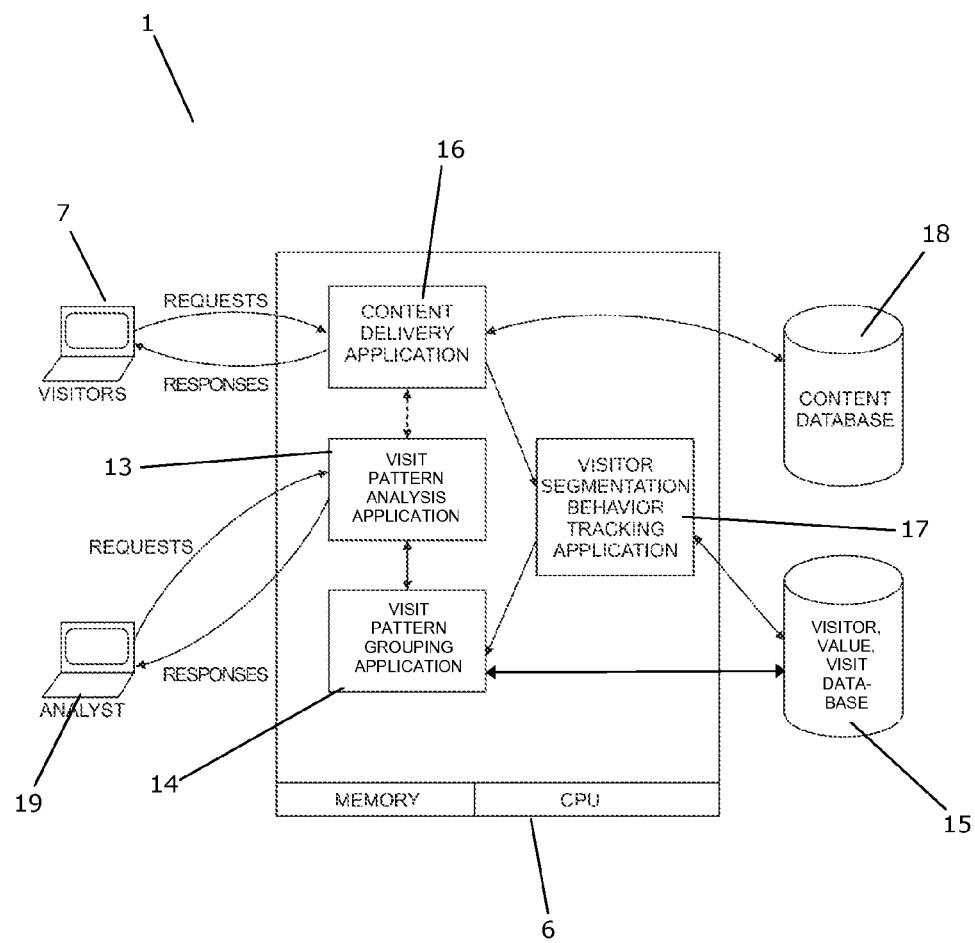
FIG. 4 is a diagrammatic view of a system according to a fourth embodiment of the invention.

FIG. 4 is a diagrammatic view of a system 1 according to a fourth embodiment of the invention. The system of FIG. 4 could advantageously form part of or cooperate with the system 1 of FIG. 3.

The system 1 of FIG. 4 comprises a content delivery application 16, a visit pattern analysis application 13, a visit pattern grouping application 14 and a visitor segmentation behaviour tracking application 17, all residing on a server 6. It should be noted that the applications 13, 14, 16, 17 could, alternatively, be residing on two or more separate servers. The system 1 is also suited for being used for analysing traffic on a website.

A visitor accesses the content of the website from a client device 7, and the content delivery application 16 delivers content to the client device 7 upon request from the visitor, thereby allowing the visitor to view desired content and/or perform desired actions within the website. The content is supplied to the content delivery application 16 by a content database 18. The visitor segmentation behaviour tracking application 17 monitors the navigations and/or actions performed by the visitor. During this, the visitor segmentation behaviour tracking application 17 registers a sequence of pages viewed by the visitor and/or actions performed by the visitor during the visit, and generates a value point score for the visit, e.g. as described above with reference to FIG. 1. The visitor segmentation behaviour tracking application 17 further registers and categorises the origin of the visit. The value point score and the origin of the visit are stored together in a visitor, value, visit database 15.

The visitor may perform one or more subsequent visits on the website. When this occurs, the visitor segmentation behaviour tracking application 17 inquires the visitor, value, visit database 15 in order to identify and locate the stored data relating to previous visit(s) by the visitor on the website. Data relating to the current visit is then stored along with the previous data, thereby registering a sequence of visits for each of the visitors visiting the website.

Based on data originating from a plurality of visitors, the visit pattern grouping application 14 builds visit patterns. The visit patterns are based on the origins of each visit by the relevant visitors, and the sequences of visits form the visit patterns. The visit patterns are communicated to the visitor, value, visit database 15, where they are stored. Thus, the visit pattern grouping application 14 is able to supply new visit patterns to the visitor, value, visit database 15 for storage, and it is able to receive stored visit patterns from the visitor, value, visit database 15 for performing detailed analysis of new visit patterns and/or for building more complex visit patterns.

An analyst accesses the visit pattern analysis application 13 from an analyst device 19, and the visit pattern analysis application 13 delivers analysis data to the analyst device 19 upon requests from the analyst. Thereby the analyst is capable of obtaining information regarding the visit patterns stored in the visitor, value, visit database 15, as well as regarding the value point scores stored along with these visit patterns. Thereby the analyst can analyse the visit patterns, e.g. in order to investigate which origins of visit generate value for the website owner and which do not, as described above with reference to FIG. 3.

Figure 5:
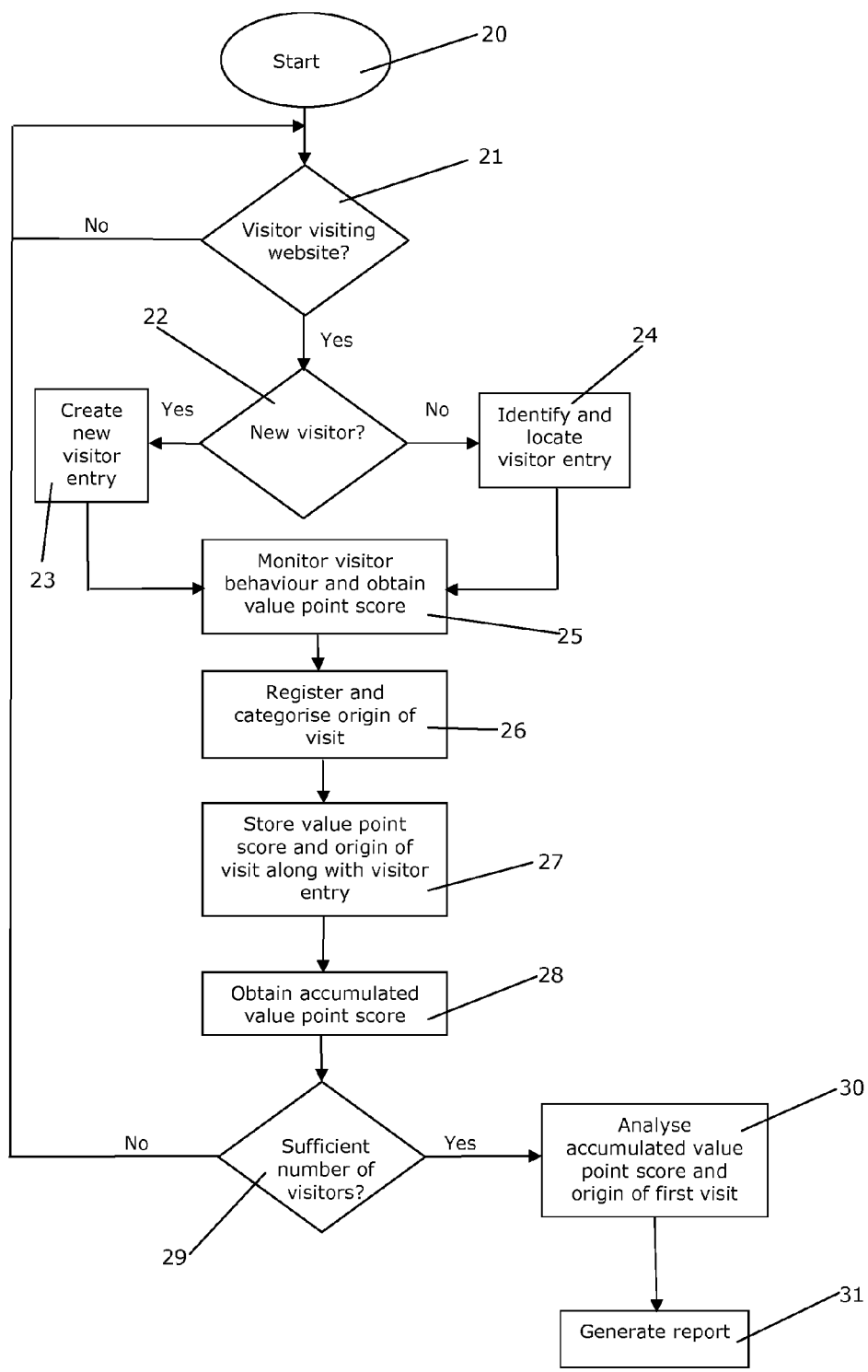
FIG. 5 is a flow diagram illustrating a method according to an embodiment of the invention.

FIG. 5 is a flow diagram illustrating a method according to an embodiment of the invention. The process is started at step 20. At step 21 it is investigated whether or not a visitor is visiting the website. If this is not the case, the process is returned to step 21, i.e. the website is monitored until a visitor is detected.

If step 21 reveals that a visitor is visiting the website, it is investigated whether or not the visitor is a new visitor, i.e. whether or not the visitor has visited the website previously. In the case that step 22 reveals that the visitor is a new visitor, a new visitor entry is created at step 23. In the case that step 22 reveals that the visitor has previously visited the website, the visitor entry of the visitor is identified and located at step 24.

The behaviour of the visitor is then monitored at step 25. This results in a value point score for the visit being obtained. The value points are accumulated in accordance with content viewed by the visitor and actions performed by the visitor, and in accordance with predefined value point settings associated with the content of the website. The value point settings have been assigned to the content previously, e.g. when the content was created, by the website owner or manager. The value point settings are selected in such a manner that they reflect value generated for the website owner when a visitor views specific content or performs specific actions. When a visitor visits the website, a value point score is accumulated by continuously adding values defined by the value point settings. Thus, when a visitor views a specific piece of content or performs a specific action, the value point setting associated with that specific piece of content or action is added to the value point score of the visit. When the visit is completed, a value point score has been generated, and the value point score reflects the total value generated for the website owner during the visit.

At step 26 the origin of the visit is registered and categorised in accordance with two or more categories of origin. The origin of the visit provides information regarding where the traffic came from. It may, e.g., be a specific search engine, a direct entry via the browser, following a link in a web advertisement, following a link in an e-mail campaign, following a link from a blog, etc. The categories of origin may, e.g., be referrals from search engines, referrals from e-mail campaigns, links from web advertisements, links from blogs, etc. Furthermore, one category may be 'not referral', i.e. all traffic which was not referred to the website, such as the visitor typing the address of the website directly into the browser. Thereby the website owner obtains information regarding which kinds of origin of the visits generate value for the website owner and which do not.

At step 27 the value point score of the visit and the categorised origin of the visit are stored along with the visitor entry in a storage device. Thus, correlated information regarding the obtained accumulated value point score and the origin and category of origin of the visit is stored, for each of a sequence of visits performed by the visitor on the website. This provides information for the website owner or manager regarding where the value generated for the website owner came from.

At step 28 an accumulated value point score for the visitor is obtained by adding value point scores for each of the visits performed by the visitor on the website. The accumulated value point score may advantageously be stored along with the visitor entry, i.e. together with the information relating to the visitor which has already been stored. Thereby the stored data for each visitor contains information regarding the total value generated by the visitor and information regarding origin and the category of origin of the first visit by the visitor on the website, i.e. regarding what initially lead the visitor to the website.

At step 29 it is investigated whether or not a sufficient number of visitors have visited the website, i.e. whether or not a sufficient number of categorised accumulated value point scores, origins of visits and sequences of visits have been obtained. If this is not the case, the process is returned to step 21 in order to obtain further value point scores and origins of visits.

In the case that step 29 reveals that a sufficient number of visitors have visited the website, the categorised accumulated value point scores and origins of first visits are analysed at step 30. In the present context the term 'sufficient' should be interpreted to mean that the number of visitors having visited the website is high enough to allow statistical analysis to be performed on the obtained data. For instance, the number of visitors could correspond to a given fraction of a given population of visitors, the fraction providing an acceptable confidence level in the subsequent analysis. The analysis may reveal how the obtained accumulated value point scores are distributed among the various categories of origin of the first visit. The analysis may further reveal how the accumulated value point scores are distributed among various origins of visit within the individual categories. Finally, a report is generated at step 31. The report presents the result of the analysis performed at step 30, and thereby provides valuable information to the website owner or manager regarding where the generated value for the website owner came from.

Figure 6:
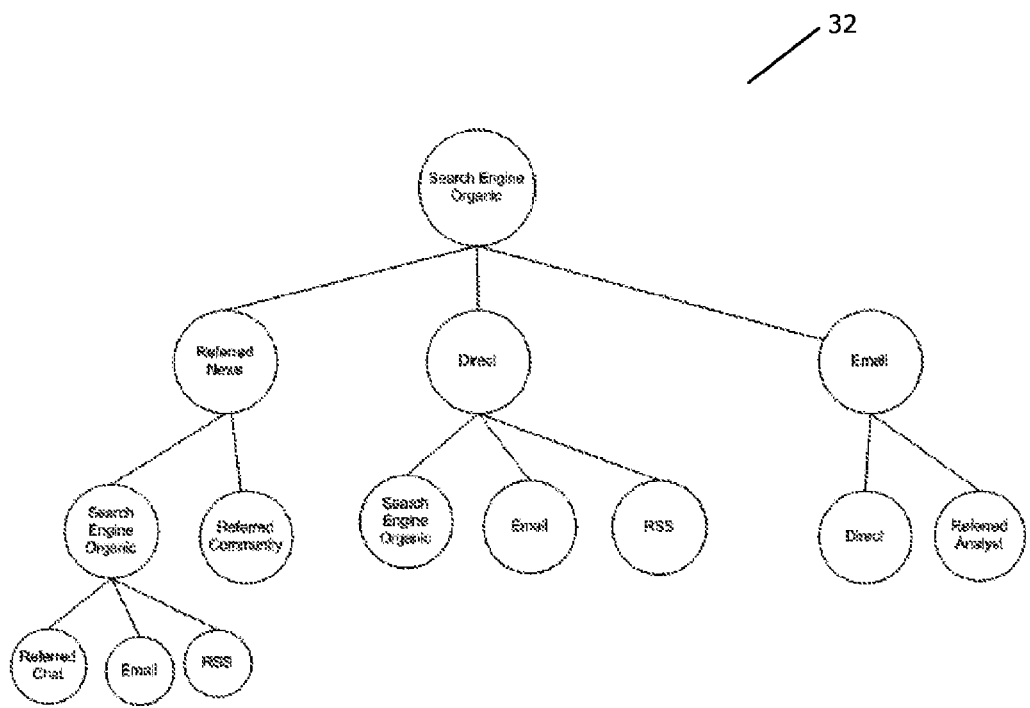
FIG. 6 is an ordered tree data structure built in accordance with a method according to an embodiment of the invention.

FIG. 6 is an ordered tree data structure 32, built in accordance with a method according to an embodiment of the invention. The ordered tree data structure 32 illustrates sequences of visits for a plurality of visitors of a website, each visit having origin of the visit which has been categorised. The nodes of the ordered tree data structure 32 of FIG. 6 correspond to categories of origin of the visits. Eight categories of origin, i.e. Search Engine Organic, Referred News, Direct, Email, Referred Community, RSS, Referred Analyst and Referred Chat, lead the visitors to the website. In the ordered tree data structure 32 of FIG. 6, the first visit of all visitors analysed was referred to the website by Search Engine Organic. The origin of the second visit by the visitors fall into three categories of origin, i.e. Referred News, Direct and Email. These categories of origin thereby constitute a level two of the ordered tree data structure 32.

Some of the visitors where the category of the origin of the second visit on the website was Referred News performed a third visit on the website. The category of origin of the third visit for these visitors was either Search Engine Organic or Referred Community. These categories of origin constitute a level three of the ordered tree data structure.

Similarly, some of the visitors where the category of the origin of the second visit on the website was Direct also performed a third visit on the website. For these visitors, the category of the origin of the third visit was either Search Engine Organic, Email or RSS. Finally, some of the visitors where the category of the origin of the second visit was Email also performed a third visit on the website. For these visitors, the category of the origin of the third visit was either Direct or Referred Analyst.

Of the visitors where the category of the origin of the first visit was Search Engine Organic, the category of the origin of the second visit was Referred News and the category of the origin of the third visit was Search Engine Organic some performed a fourth visit on the website. For these visitors, the category of the origin of the fourth visit was either Referred Chat, Email or RSS. None of these visitors in turn performed a fifth visit.

In the ordered tree data structure 32 illustrated in FIG. 6, the categories of the origins of the visits performed by the visitors form nodes of the ordered tree data structure 32. Some of the categories of origin occur several times in the ordered tree data structure 32, indicating that the categories of the origin of the sequences of visits of the various visitors did not occur in the same order. For instance the Email category occurs three times in the ordered tree data structure as three different nodes, arranged at level two, level three and level four, respectively. Thus, for some visitors, the visit originating from an Email was the second visit, for some the third visit, and for some the fourth visit.

When the ordered tree data structure 32 has been built, analysis can be performed on the ordered tree data structure 32 in order to extract valuable information regarding the value generated by the visitors, and the origins of the visits.

It should be noted that two or more ordered tree data structures, e.g. of the kind shown in FIG. 6, could be built on the basis of a given data set, the data used for each ordered tree data structure being selected carefully according to a set of criteria defined by the website owner or manager, or by an analyst. For instance, one ordered tree data structure may comprise data originating from visitors which in general generated high value, while another ordered tree data structure may comprise data originating from visitors which in general generated low value. By comparing these two ordered tree data structures, it may be possible to extract information regarding why the first group of visitors generated more value than the second group of visitors. As an alternative, one ordered tree data structure may comprise data originating from visitors located in English speaking countries, while another ordered tree data structure may comprise data originating from visitors located in non-English speaking countries. Comparing these two ordered tree data structures may reveal differences in value generated by these two groups of visitors, as well as differences in the origins of the visits performed by the visitors of these two groups of visitors.

Figure 7:
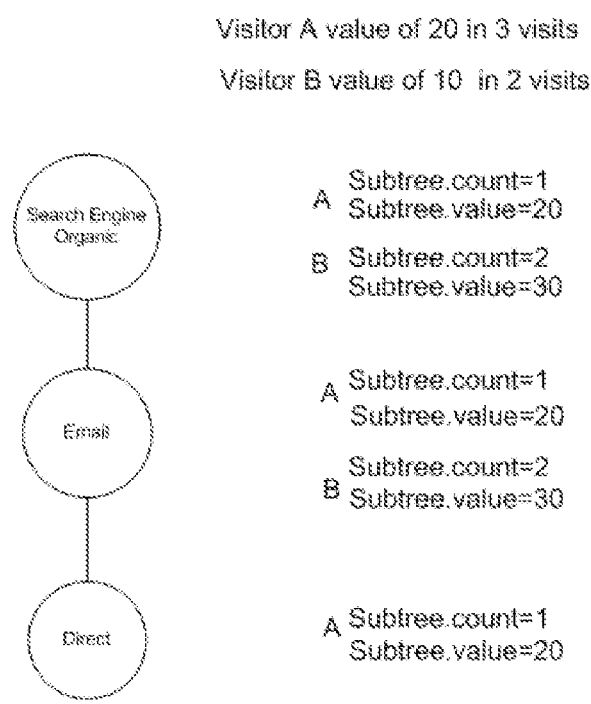
FIG. 7 illustrates calculation of node points in a part of an ordered tree data structure.

FIG. 7 illustrates calculation of node points in a part of an ordered tree data structure similar to the structure 32 of FIG. 6. In FIG. 7 a visit pattern comprising three nodes, i.e. Search Engine Organic, Email and Direct, is shown. Two visitors, A and B, performed a sequence of visits on the website. Visitor A accumulated 20 value points during three visits, and visitor B accumulated 10 value points during two visits. The first visit of visitor A had an origin within the category Search Engine Organic, the second visit had an origin within the category Email, and the third visit had an origin within the category Direct.

The first visit of visitor B also had an origin within the category Search Engine Organic, and the second visit had an origin within the category Email. Visitor B's visits occurred later than visitor A's visits.

A node value and a node count are assigned to each of the nodes. The node value is the sum of the accumulated value points of all visitors with a visit in the sequence of visits which corresponds to the node. The node count is the total number of visitors having visits corresponding to the node.

Thus, after visitor A's visits the node count of the Search Engine Organic category is 1 and the node value is 20, i.e. the accumulated value points for visitor A's visits. This is also the case for the Email category and the Direct category.

After visitor B' visits the node count of the Search Engine Organic category is 2, since the category of the origin of the first visit of visitor A as well as of visitor B was Search Engine Organic. The node value of the Search Engine Organic category is 30, i.e. the sum of the accumulated value points for visitor A, 20, and the accumulated value points for visitor B, 10. The node count for the Email category is also 2 and the node value is 30, since the category of the second visit of visitor A as well as of visitor B was Email. However, the node count of the Direct category remains 1 and the node value remains 20, since visitor B didn't have a visit with an origin with the category Direct.

The invention claimed is:

1. A method for analysing traffic on a website, the website being arranged on a server, the method comprising the steps of:
   allowing a visitor to perform a first visit on the website,
   monitoring, by a computer device, navigations and/or actions performed by the visitor during the first visit while accumulating value points in accordance with content viewed by the visitor and actions performed by the visitor, and in accordance with predefined value point settings associated with content of the website, thereby obtaining a value point score for the first visit,
   registering an origin of the first visit, leading the visitor to the website,
   storing the value point score for the first visit along with the registered origin of the first visit in a storage device, categorising the stored value point score for the first visit and the origin of the first visit according to type of origin in accordance with two or more predefined categories of origin, allowing the visitor to perform one or more subsequent visit(s) on the website, for each subsequent visit, monitoring navigations and/or actions performed by the visitor during the visit while accumulating value points in accordance with content viewed by the visitor and actions performed by the visitor, and in accordance with predefined value point settings associated with content of the website, thereby obtaining a value point score for each subsequent visit, obtaining an accumulated value point score for the visitor by adding the obtained value point scores of the first visit and each of the subsequent visit(s), allowing a plurality of visitors to perform one or more visits on the website, for each visitor, registering a sequence of visits on the website, registering and categorising origin of each visit, obtaining value point score of each visit, and obtaining an accumulated value point score for the visitor, defining a set of visitors from the plurality of visitors, and building visit patterns based on the categorized origins of each visit by the visitors of the set of visitors, where the registered sequences of visits form the visit patterns, the visit patterns including one or more full visit patterns, each full visit pattern corresponding to a complete registered sequence of visits of at least one visitor, wherein the visit patterns form an ordered tree data structure, where the categories of the origins of the visits form nodes of the ordered tree data structure, wherein the ordered tree data structure is built such that a sequence of nodes in an order along a path extending downwardly and starting from a node at a first level of the ordered tree data structure and ending at a node from which no branches extend downwardly represents a sequence of visits to the website by at least one of visitors of the set of visitors, said visits respectively originating from the categorized origins corresponding to the sequence of nodes, and the sequence of visits to the website is in the same order of the sequence of nodes, wherein the sequence of visits to the website are originating from different categorized origins.

2. The method according to claim 1, further comprising the step of storing the accumulated value point score in the storage device along with the registered and categorised origin of the first visit.

3. The method according to claim 1, further comprising the steps of, for each subsequent visit:
registering an origin of the visit, leading the visitor to the website, and
storing the value point score of the visit along with the registered origin of the visit in the storage device.

4. The method according to claim 3, further comprising the step of categorising the origin of each subsequent visit according to type of origin in accordance with two or more predefined categories of origin.

5. The method according to claim 1, further comprising the steps of:
analysing accumulated value point scores and categorised origins of the first visits originating from a plurality of visitors on the website, and
generating a report providing information regarding accumulated value point scores originating from predefined categories of origin.

6. The method according to claim 5, further comprising the step of generating at least one sub-report providing information regarding accumulated value point scores originating from various origins of first visits within a predefined category of origin.

7. The method according to claim 5, wherein the step of generating a report comprises generating and displaying a visual representation of the accumulated value point scores and the predefined categories of origin.

8. The method according to claim 5, further comprising the step of registering time elapsed between visits of the visitor on the website, and wherein the generated report further provides information regarding time elapsed between visits of the visitor.

9. The method according to claim 5, further comprising the step of registering time duration of each visit performed by the visitor on the website, and wherein the generated report further provides information regarding time duration of the visits of the visitor.

10. The method according to claim 5, wherein the step of obtaining an accumulated value point score is performed immediately prior to or as a part of the step of analysing.

11. The method according to claim 1, further comprising the steps of:
defining a set of visitors having been exposed to a predefined campaign, and
for each visitor of the set of visitors, defining a visit originating from the predefined campaign as the first visit on the website by the visitor.

12. The method according to claim 1, further comprising the step of:
for each full visit pattern, calculating a total visit value being the sum of accumulated value point scores for all visitors with registered sequences forming said full visit pattern.

13. The method according to claim 12, further comprising the step of identifying a most efficient full visit pattern being the full visit pattern with the highest total visit value per visitor in the full visit pattern.

14. The method according to claim 1, wherein the visit patterns further include at least one partial visit pattern, each partial visit pattern corresponding to a part of registered sequence of at least one visitor.

15. The method according to claim 14, further comprising the steps of:
analysing each partial visit pattern, and
for each partial visit pattern, identifying a value point loss for said partial visit pattern, based on the analysis step.

16. The method according to claim 1, further comprising the steps of:
for each visitor, assigning a node value to each node corresponding to a visit of the sequence of visits, the node value being the accumulated value point score for the visitor, and
for each node, calculating a total node value being the sum of all node values assigned to the node.

17. The method according to claim 16, further comprising the step of assigning a node count to each node, the node count being the number of visitors having a sequence of visits including a visit corresponding to said node.

18. The method according to claim 17, further comprising the step of, for each node, calculating a total node efficiency per visitor being the total node value divided by the node count.

19. The method according to claim 16, further comprising the step of analysing the ordered tree data structure and the node values.

20. The method according to claim 19, further comprising the step of identifying a most valuable full visit pattern of the ordered tree data structure, based on the analysis step.

21. The method according to claim 19, further comprising the step of identifying a most efficient full visit pattern of the ordered tree data structure, based on the analysis step.

22. The method according to claim 19, further comprising the step of identifying a most valuable node of the ordered tree data structure, based on the analysis step.

23. The method according to claim 19, further comprising the step of identifying a most efficient node of the ordered tree data structure, based on the analysis step.

24. The method according to claim 1, wherein the origin of the first visit includes a referral which referred the visitor to the website.

25. A system for analysing traffic on a website arranged on a server, the system comprising:
- a monitoring module adapted to monitor navigations and/or actions performed by a visitor during a sequence of visits on the website by said visitor, said monitoring module further being adapted to accumulate value points in accordance with content viewed by the visitor and actions performed by the visitor, and in accordance with predefined value point settings associated with the content of the website, thereby obtaining a value point score for each visit of the sequence of visits, said monitoring module further being adapted to register an origin of a first visit of said sequence of visits, leading the visitor to the website at said first visit, and said monitoring module further being adapted to add obtained value point scores of each of the visits of the sequence of visits, thereby obtaining an accumulated value point score for the visitor,
- a storage device for storing value point scores and/or accumulated value point scores along with registered origins of first visits, for each visitor visiting the website,
- a categorising module adapted to categorise stored accumulated value point scores and origins of first visits according to type of origin in accordance with two or more predefined categories of origin, and
- an analysis module adapted to analyse stored and categorised accumulated value point scores and origins of first visits originating from a plurality of visitors, wherein the analysis module is adapted to build visit patterns based on sequences of visits by visitors of a defined set of visitors, where the sequences of visits form the visit patterns, and wherein the visit patterns form an ordered tree data structure, where the categories of the origins of the visits form nodes of the ordered tree data structure, wherein the ordered tree data structure is built by the analysis module such that a sequence of nodes in an order along a path extending downwardly and starting from a node at a first level of the ordered tree data structure and ending at a node from which no branches extend downwardly represents a sequence of visits to the website by at least one of visitors of the set of visitors, said visits respectively originating from the categorized origins corresponding to the sequence of nodes, and the sequence of visits to the website is in the same order of the sequence of nodes, wherein the sequence of visits to the website are originating from different categorized origins.

26. The system according to claim 25, wherein the categorising module forms part of the monitoring module.

27. The system according to claim 25, said system residing on the server having the website arranged thereon.

28. The method according to claim 1, wherein the ordered tree data structure is built such that a node at a first level of the ordered tree data structure represents that a first visit to the website by at least one of the visitors of the set of visitors originates from the categorized origin corresponding to the node at the first level of the ordered tree data structure.

29. The method according to claim 1, wherein the ordered tree data structure is built such that the number of nodes of a sequence of nodes along a path extending downwardly and starting from a node at a first level of the ordered tree data structure and ending at a node from which no branches extend downwardly represents the number of visits to the website for at least one of the visitors of the set of the visitors.

30. The system according to claim 25, wherein the ordered tree data structure is built by the analysis module such that a node at a first level of the ordered tree data structure represents that a first visit to the website by at least one of the visitors of the set of visitors originates from the categorized origin corresponding to the node at the first level of the ordered tree data structure.

31. The system according to claim 25, wherein the ordered tree data structure is built by the analysis module such that the number of nodes of a sequence of nodes along a path extending downwardly and starting from a node at a first level of the ordered tree data structure and ending at a node from which no branches extend downwardly represents the number of visits to the website for at least one of visitors of the set of the visitors.

* * * * *